United States Patent
Naing et al.

(10) Patent No.: US 10,346,096 B1
(45) Date of Patent: Jul. 9, 2019

(54) SHINGLED MAGNETIC RECORDING TRIM OPERATION

(71) Applicant: Seagate Technology LLC, Cupertino, CA (US)

(72) Inventors: Yan Naing, Singapore (SG); Harry Tiotantra, Singapore (SG); PohGuat Bay, Singapore (SG); Thein Than Zaw, Singapore (SG); CheeHou Peng, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/016,197

(22) Filed: Jun. 22, 2018

Related U.S. Application Data

(63) Continuation of application No. 15/848,374, filed on Dec. 20, 2017, now Pat. No. 10,025,534.

(51) Int. Cl.
*G11B 5/09* (2006.01)
*G11B 27/36* (2006.01)
*G11B 20/10* (2006.01)
*G06F 3/06* (2006.01)
*G11B 20/12* (2006.01)
*G06F 12/0868* (2016.01)

(52) U.S. Cl.
CPC ............ *G06F 3/0676* (2013.01); *G06F 3/068* (2013.01); *G06F 3/0608* (2013.01); *G06F 3/0656* (2013.01); *G06F 3/0658* (2013.01); *G06F 12/0868* (2013.01); *G11B 20/10527* (2013.01); *G11B 20/1252* (2013.01)

(58) Field of Classification Search
CPC ........... G11B 5/012; G11B 27/36; G11B 5/02; G11B 2220/20; G11B 27/3027; G11B 2320/90; G11B 20/18; G06F 2212/7205; G06F 3/0665; G06F 3/064; G06F 3/0604; G06F 3/0614; G06F 3/0641; G06F 3/0608; G06F 3/0652; G06F 3/0689
USPC .......................................... 360/25, 31, 48, 53
See application file for complete search history.

(56) References Cited

U.S. PATENT DOCUMENTS

| | | |
|---|---|---|
| 8,654,472 B2 | 2/2014 | Hall et al. |
| 8,922,930 B1 | 12/2014 | Weikal |
| 8,949,512 B2 * | 2/2015 | Vogan ................. G06F 12/0246 711/103 |
| 9,092,337 B2 * | 7/2015 | Nellans ............... G06F 12/0804 |
| 2017/0083246 A1 | 3/2017 | Liu et al. |
| 2017/0177266 A1 | 6/2017 | Doerner et al. |

(Continued)

*Primary Examiner* — Nabil Z Hindi
(74) *Attorney, Agent, or Firm* — Holzer Patel Drennan

(57) ABSTRACT

Implementations disclosed herein include a method comprising receiving a TRIM request for a media cache in a storage media from a host, determining whether a TRIM range in the TRIM request overlaps with an active operation, invalidating the TRIM range responsive to determining that the TRIM range does not overlap with an active operation, and inserting at least one null node in the media cache. The method may comprise receiving a host read request, performing a media cache search for a read LBA range, and determining where data is located. If all the data is located in the media cache, the system reads from the media cache. If the data is located in a null node, patterning for the null node occurs. If the data is located partially in the main store, the media cache, or a null node, the data may be read, combined, and returned to the host.

18 Claims, 4 Drawing Sheets

(56) References Cited

U.S. PATENT DOCUMENTS

2017/0220264 A1 8/2017 Sokolov et al.
2017/0255556 A1 9/2017 Peng et al.

* cited by examiner

SHINGLED MAGNETIC RECORDING TRIM OPERATION

PRIORITY CLAIM

The present application is a continuation application of U.S. patent application Ser. No. 15/848,374 filed Dec. 20, 2017, and titled "Shingled Magnetic Recording Trim Operation", which is hereby incorporated by reference in its entirety.

BACKGROUND

Shingled magnetic recording allows for increased cell density, but generally entails re-writing an entire band of shingled data when one or more cells within the band are changed. As a back-up during the re-writing, the data is temporarily saved to a second, temporary memory (e.g., a media cache, etc.).

SUMMARY

In one implementation, the disclosed technology provides a method that includes receiving a TRIM request for a media cache in a storage media from a host, determining whether a TRIM range in the TRIM request overlaps with an active operation, invalidating the TRIM range responsive to determining that the TRIM range does not overlap with an active operation, and inserting at least one null node in the media cache. The method may comprise receiving a host read request, performing a media cache search for a read LBA range, and determining where data is located. If all the data is located in the media cache, the system reads from the media cache. If the data is located in a null node, patterning for the null node occurs. If the data is located partially in the main store, the media cache, or a null node, the data may be read, combined, and returned to the host.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
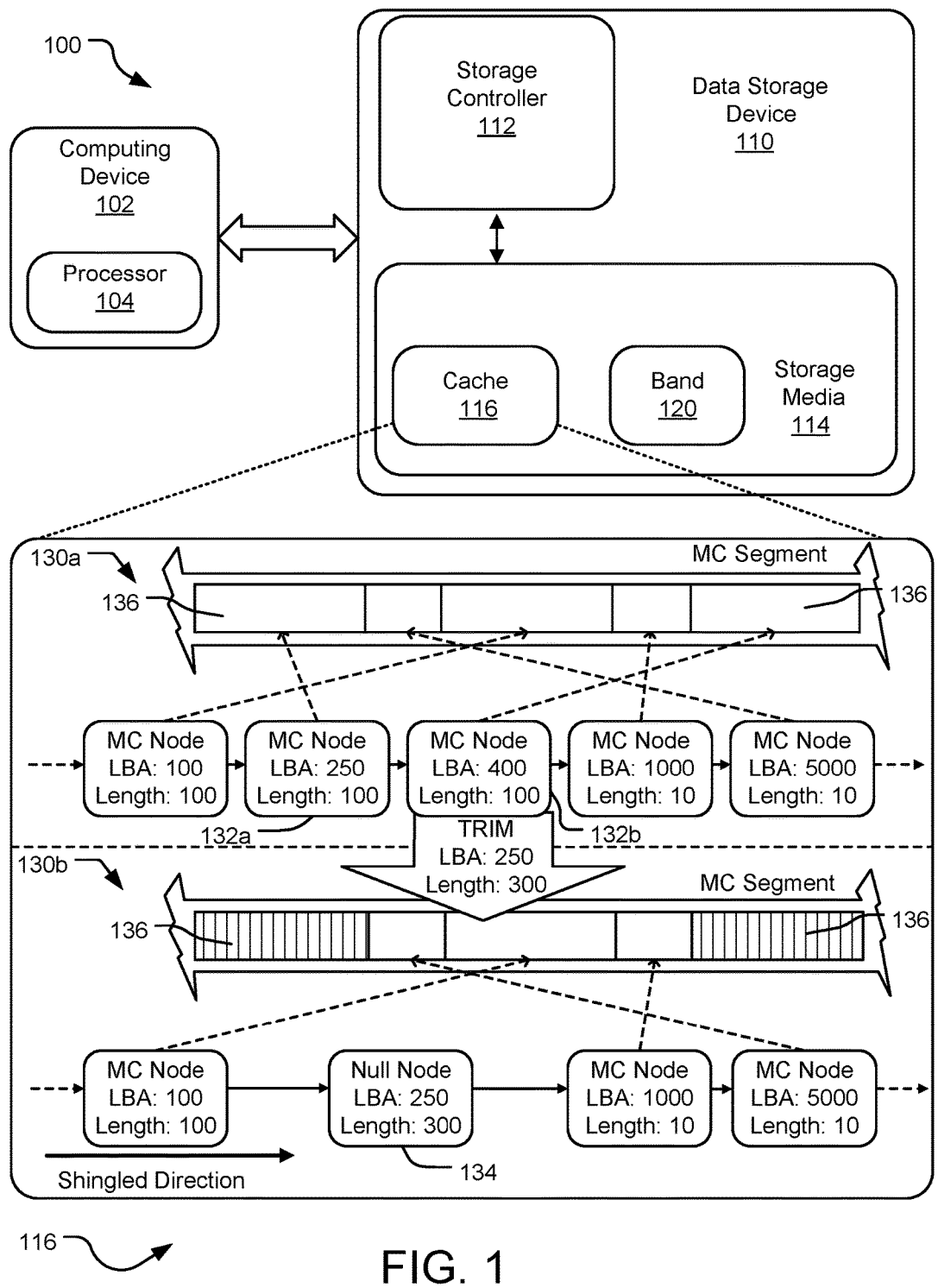
FIG. 1 illustrates a block diagram of an example data storage device system using a disclosed TRIM method.

Data storage systems and devices may use a plurality of data storage areas or locations for temporary storage of data, in addition to a main data storage area (main store). Such temporary storage areas may include media cache (MC), etc. A storage controller of such data storage systems may be used for a variety of purposes, including storing data in a MC or a buffer in response to write commands received from a host or computing device, storing data in the MC for a rewrite operation, storing data in the MC for write operation optimization purposes, etc.

In non-shingled magnetic media, each of the cells on a magnetized medium are of a sufficiently larger size relative to the size of the write pole to allow the write pole to write data to the cells without overwriting data in any surrounding cells. As a result, data may be written to available cells anywhere on the magnetic medium. However, as requirements for data storage density increase for magnetic media, cell sizes decrease.

A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data being overwritten during a write operation is shingled magnetic recording (SMR).

An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten. In SMR, a write element may be large enough to affect two adjacent data tracks on a single pass. If the write element is displaced from a target position, adjacent tracks on either side of a target track can be affected.

In SMR drives, if the write operations to a track cause the data in adjacent track to become unreadable, the performance of some storage devices may be negatively affected by the presence of unreadable adjacent track data. Therefore, that unreadable adjacent track data may be protected by storing it in DRAM and/or storing it into MC. The unreadable adjacent track data that stores into MC due to direct writes to SMR track may be called guard track data.

Storage devices can be monitored and controlled to reclaim space. A "TRIM" command may be used to inform storage devices which tracks are no longer in use. The storage device can then perform a garbage collection of the unused tracks to mitigate the performance penalty associated with the unused tracks. Similarly, an SMR HDD can make use of a TRIM method to discard MC nodes within a trimming range, which in turn reduces cleaning band rewrite operation (BRO) time and can recycle a MC segment faster. MC nodes are a plurality of sets of consecutive logical block addresses (LBAs) stored in a cache.

TRIM operations can invalidate a storage range immediately. However, in due to the architecture design in SMR, a TRIM operation will also remove guard tracks. To prevent guard track data removal by a TRIM operation, a complex process including exhaustive searches are needed. As a result, a TRIM operation can be a time-intensive process. Further, due to the precaution handling on a TRIM operation, SMR may not gain much benefit from a TRIM operation.

The disclosed technology proposes a TRIM operation similar to a write command without payload data to an SMR drive. The TRIM methods include replacing media cache (MC) data nodes with null (or TRIM) nodes responsive to determining that the MC data nodes overlap a TRIM range. If the MC data nodes do not overlap a TRIM range, at least one null node is added. As a result, discarding MC nodes is not required.

When a host or drive reads an LBA of a trimmed range, a fixed data pattern may be padded and returned to the host or drive. For all read commands to an LBA after a TRIM operation, a drive returns random data (e.g., garbage/dummy) or a "zero". For actual implementation, a drive returns a zero to all read commands to the LBA after a TRIM operation. Therefore, padding a fixed data pattern includes the drive allocating a buffer with a "zero" data pattern and a return to the requester. Padding a fixed data pattern may be performed by either firmware or hardware. When write commands are added into the MC and invalidation on the TRIM node is performed, the TRIM node invalidation handling is the same as normal MC nodes.

As a result, the TRIM operation time reduces significantly. Overall drive read performance improves if the LBA of a trimmed range because the drive will return a fixed data pattern from DRAM to the requester (host or drive) without media access. Further, there may be faster cleaning BROs on trimmed LBA ranges. Further yet, stale MC nodes may be replaced by TRIM nodes, which will reduce the number of MC nodes needed to be read in a read operation.

FIG. 1 illustrates a block diagram of an example data storage system 100, showing various functional components used to control the operation of a data storage device 110 (e.g., an SMR HDD, an SMR SSHD, an object storage device, etc.).

The data storage system 100 includes a computing device 102 (e.g., a host, a computer, a server, a mobile device, the internet, etc.) operably connected to the data storage device 110, each of the computing device 102 and the data storage device 110 communicating with each other. The computing device 102 may be operably connected to the data storage device 110 by way of a wired or wireless connection, or by a local area network (LAN) or wide area network (WAN).

A processor 104 is located in the computing device 102. The processor 104 sends one or more read or write commands to a storage device controller 112 for execution. As control communication paths are provided between a computing device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a cache 116 that is either a storage area on the storage media 114 or another non-volatile memory accessible by the data storage device 110. In the depicted system 100, the cache 116 is a storage area on the storage media 114.

A band (e.g., a band 120) of shingled tracks (not shown) may also be located in the storage media 114. When data is written to one of the shingled tracks (except for the last data track), a writing operation can affect data on an adjacent track in a down-track direction.

Referring to FIG. 1, an exploded view from the cache 116 showing a MC segment before (e.g., MC segment 130a) and the MC segment after (e.g., MC segment 130b) a null (or TRIM) node 134 is inserted in response to a TRIM request. The shingled direction of the shingled MC segment is depicted by the shingled direction arrow.

When the TRIM request is received, it is determined whether MC nodes in the MC overlap TRIM ranges in the TRIM request. If it is determined that MC nodes in the MC overlap with TRIM ranges in the TRIM request, the MC nodes are discarded and a null node 134 may be inserted to record discarded MC node data that overlaps with TRIM LBA ranges. A null node is similar to a MC node, as it has a start LBA and length. However, the null node does not have a valid physical location. The disc LBA for the null node is beyond a valid physical range.

Referring to FIG. 1, when the data storage device 110 receives a TRIM request, for example, the TRIM request for a LBA: 250 and Length: 300, MC nodes may be looked up in a table (not shown) that correspond to the TRIM request. As shown, the MC node 132a has a LBA: 250 and Length: 100, and MC node 132b has a LBA: 400 and Length: 100, which correspond to the outer sectors 136 of the MC segment 130a, overlap with the TRIM ranges and may be discarded. A null node 134 of LBA: 250 and Length: 300 may be inserted in the media cache to record the TRIM ranges. The null node 134 may be added to a table. In some implementations, instead of adding a new node type in the same table, a dedicated TRIM table may be used.

The TRIM request is performed similar to a MC node that records write commands except that the null node 134 does not have payload data, and therefore, no MC segments are needed for the TRIM operation. When a host or drive reads a data access trimmed LBA range, a fixed data pattern will resume. Padding a fixed data pattern may be performed by either firmware or hardware. Null node invalidation operations are performed the same way as for normal MC nodes.

Figure 2:
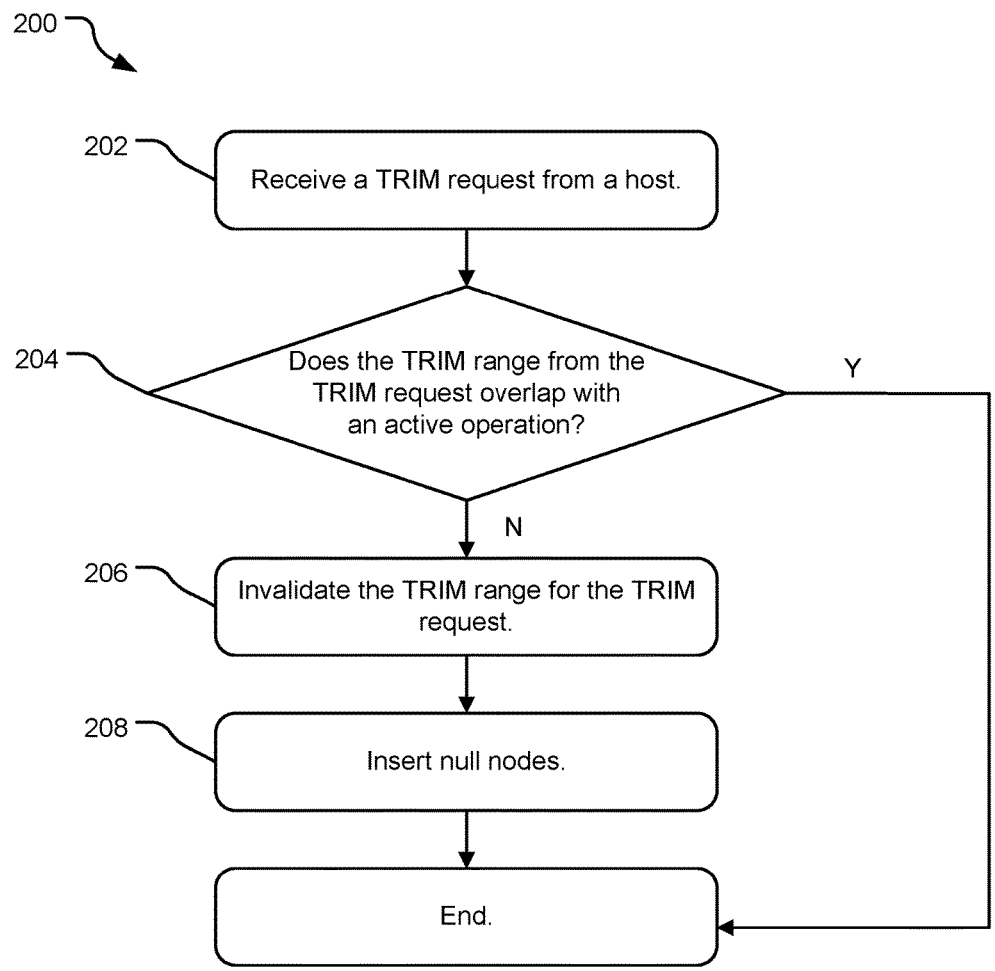
FIG. 2 is a flowchart of example operations for performing a disclosed TRIM operation.

FIG. 2 is a flowchart of example operations 200 for performing a TRIM operation. An operation 202 receives a TRIM request from a host or other requester. An operation 204 determines whether a TRIM range in the TRIM request overlaps with an active operation, such as a write cache operation or a BRO. Data received from write commands from a host and not yet written into a media band or media cache or used in an active BRO operation are saved in a write cache and tentatively stored in DRAM. If the TRIM range overlaps with a write cache operation and/or an active BRO operation, then the operations 200 end, as an active write cache operation or BRO may be in the process of writing data into the media. Valid data in the process of a writing operation to media should not be interrupted, or else data received not committed to media may result in lost data. A TRIM operation may be ignored tentatively, and be performed after an active task, such as a write cache operation or BRO has completed.

If the TRIM range does not overlap with a write cache operation or an active BRO, then a range for the TRIM request is invalidated in an operation 206. The operation 206 marks certain LBAs as invalid (not containing valid data) because such location is where a drive discards the MC node that overlaps with the TRIM range. An operation 208 inserts null nodes in the media cache, and then operations 200 end.

Figure 3:
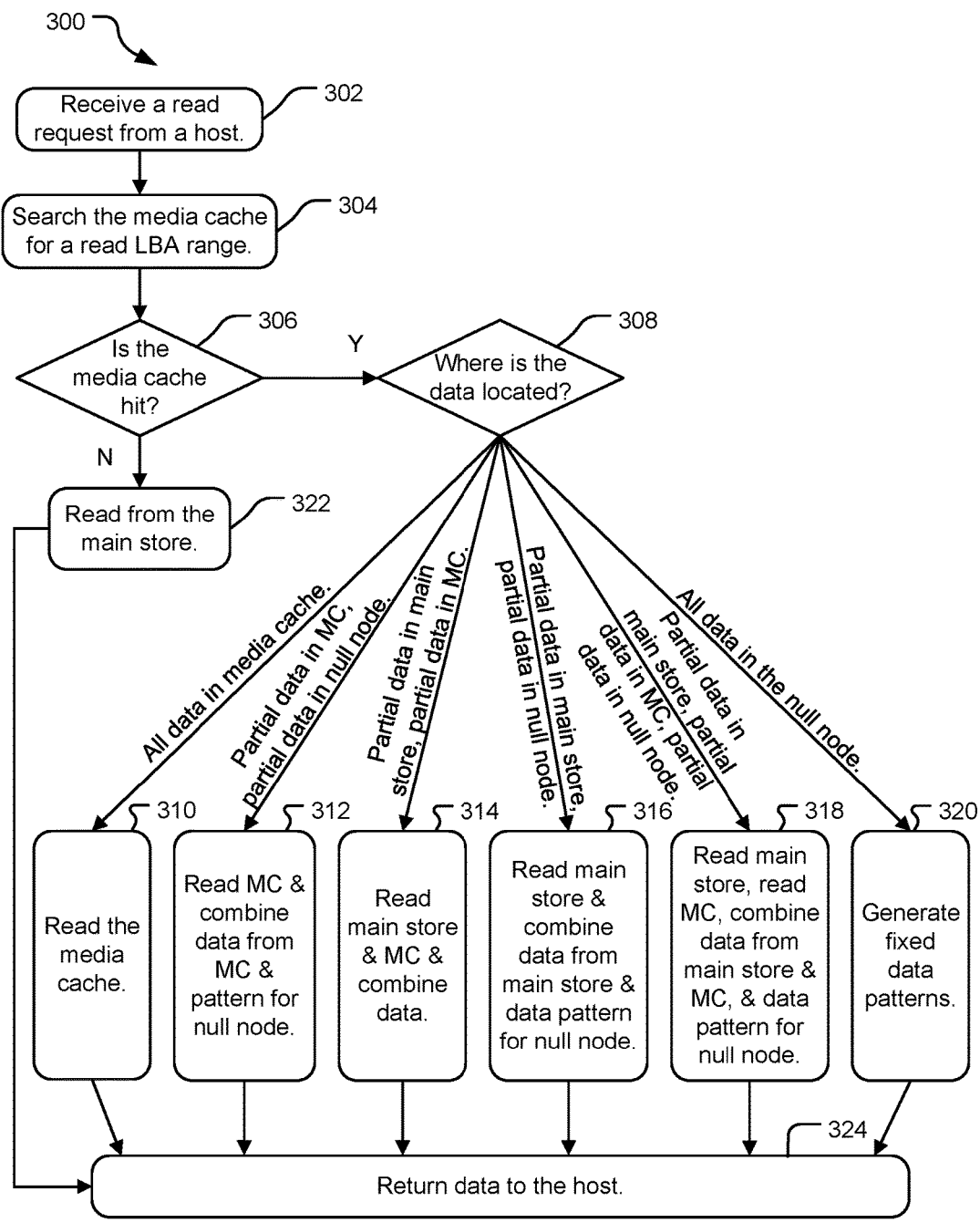
FIG. 3 is a flowchart of example operations for performing a read operation.

FIG. 3 is a flowchart of example operations 300 for performing an SMR read operation involving null or TRIM nodes. After operations 200 determine there is no overlap with the TRIM ranges, an operation 302 receives a read request from a host. An operation 304 searches the media cache for a read LBA range in the MC node(s).

An operation 306 determines whether the MC is "hit" (whether data located in the MC) and the requested LBA range is found in the MC. If the MC is hit in operation 306, an operation 308 determines where the data is located.

If all the data is located in the media cache, an operation 310 reads the media cache, and the returns data to the host in an operation 324.

If partial data is located in the MC and partial data is located in a null node, an operation 312 reads the MC, combines the data from the MC, and generates a fixed data pattern. Patterning data for the null node returns random data (garbage or dummy) or a "zero."

If partial data is located in the main store and partial data is located in the media cache, an operation 314 reads the main store and the MC, and combines the data from the main store and the MC.

If partial data is located in the main store and partial data is located in the null node, an operation 316 reads the main store, and combines data from the main store and patterns data for the null node.

If partial data is located in the main store, partial data is located in the MC, and partial data is located in the null node, an operation 318 reads the main store, and the MC, and combines data from the main store and the MC, and patterns data for the null node.

If all the data is located in a null node, an operation 320 patterns data for the null node. After all the data is read, and combined, if necessary, in operations 312-320, the data is returned to the host in an operation 324.

In some implementations, if the host requested LBA data is fragmented, and part of the data is in the media cache node(s) and/or part of the data resides in the storage media (band), stitching of the data may be required before the data is then returned to the requestor, such as the host.

If the MC is not hit in operation 306, a read operation is not required and the operation 322 reads from the main store (or band). After the operation 322 reads from the main store (or band), then data is returned to the requestor, such as the host in an operation 324.

As a result of the disclosed TRIM methods, the timing of the TRIM operation reduces significantly, as MC data invalidation becomes streamlined. The overall drive read performance improves when access trimmed LBA ranges as drive return fixed data pattern from the DRAM to the requester without media access. Further, the TRIM method results in faster cleaning in BROs on trimmed LBA ranges. Stale MC nodes are replaced by null nodes, reducing the number of MC nodes to be cleaned.

Figure 4:
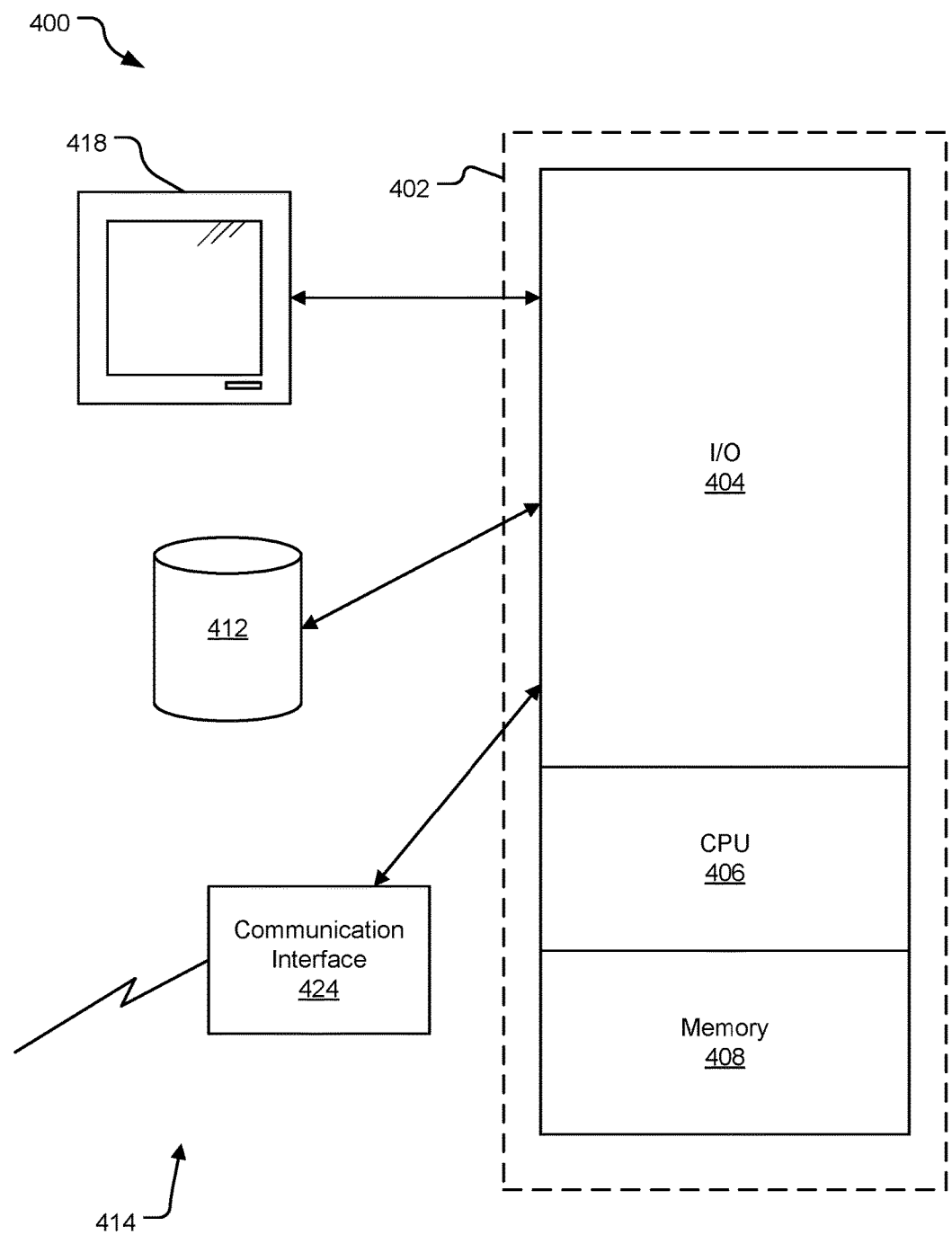
FIG. 4 illustrates a block diagram of an example computer system suitable for implementing the TRIM and read operations disclosed herein.

FIG. 4 illustrates a block diagram of an example computer system suitable for implementing the SMR technology disclosed herein. The computer system 400 is capable of executing a computer program product embodied in a tangible computer-readable storage medium to execute a computer process. Data and program files may be input to the computer system 400, which reads the files and executes the programs therein using one or more processors. Some of the elements of a computer system 400 are shown in FIG. 4 wherein a processor 402 is shown having an input/output (I/O) section 404, a Central Processing Unit (CPU) 406, and a memory section 408. There may be one or more processors 402, such that the processor 402 of the computing system 400 comprises a single central-processing unit 406, or a plurality of processing units. The processors may be single core or multi-core processors. The computing system 400 may be a conventional computer, a distributed computer, or any other type of computer. The described technology is optionally implemented in software loaded in memory 408, a disc storage unit 412 or removable memory 418.

In an example implementation, the disclosed SMR processes may be embodied by instructions stored in memory 408 and/or disc storage unit 412 and executed by CPU 406. Further, local computing system, remote data sources and/or services, and other associated logic represent firmware, hardware, and/or software which may be configured to adaptively distribute workload tasks to improve system performance. The disclosed methods may be implemented using a general purpose computer and specialized software (such as a server executing service software), and a special purpose computing system and specialized software (such as a mobile device or network appliance executing service software), or other computing configurations. In addition, program data, such as threshold requirements and other information may be stored in memory 408 and/or disc storage unit 412 and executed by processor 402.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The embodiments described herein are implemented as logical steps in one or more computer systems. The logical operations of the embodiments described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing embodiments described herein. Accordingly, the logical operations making up the embodiments described herein are referred to variously as operations, steps, objects, or modules. Furthermore, it should be understood that logical operations may be performed in any order or performed simultaneously, unless explicitly claimed otherwise or a specific order is inherently necessitated by the claim language. For example, operations 308, 312, and 316 may or may not occur at the same time.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

What is claimed is:
1. A method comprising:
    receiving a TRIM request for a media cache in a storage media from a host;
    determining whether a TRIM range in the TRIM request overlaps with an active operation; and invalidating the TRIM range responsive to determining that the TRIM range does not overlap with an active operation.

2. The method of claim 1, further comprising:
inserting at least one null node in the media cache.

3. The method of claim 1, further comprising:
receiving a read request from the host; and
performing a media cache search for a read LBA range corresponding to the read request.

4. The method of claim 1, further comprising:
determining whether the media cache is hit; and
determining where data is located responsive to determining that the media cache is hit.

5. The method of claim 4, further comprising:
determining all data is located in the media cache; and
reading the media cache responsive to determining all data is located in the media cache.

6. The method of claim 4, further comprising:
determining partial data is located in the media cache and partial data is located in a null node;
reading the media cache responsive to determining partial data is located in the media cache and partial data is located in the null node;
combining data from the media cache; and
patterning for the null node.

7. The method of claim 4, further comprising:
determining partial data is located in the media cache and partial data is located in the main store;
reading the main store and the media cache responsive to determining partial data is located in the media cache and partial data is located in the main store; and
combining data from the main store and the media cache.

8. The method of claim 4, further comprising:
determining partial data is located in the main store and partial data is located in a null node;
reading the main store responsive to determining partial data is located in the main store and partial data is located in the null node;
combining data from the main store; and
patterning for the null node.

9. The method of claim 4, further comprising:
determining partial data is located in the main store, partial data is located in the media cache, and partial data is located in a null node;
reading the main store;
reading the media cache;
combining data from the main store and the media cache; and
patterning for the null node.

10. A system comprising:
a storage media; and
a storage controller configured to:
receive a TRIM request for a media cache in a storage media from a host;
determine whether a TRIM range in the TRIM request overlaps with an active operation; and
invalidate the TRIM range responsive to determining that the TRIM range does not overlap with an active operation.

11. The system of claim 10, wherein the storage controller is further configured to:
insert at least one null node in the media cache.

12. The system of claim 11, wherein the storage controller is further configured to:
receive a read request from a host; and
perform a media cache search for a read LBA range.

13. The system of claim 12, wherein the storage controller is further configured to:
determine whether the media cache is hit; and
determine where data is located responsive to determining that the media cache is hit.

14. The system of claim 12, wherein the storage controller is further configured to:
read data from a main store responsive to determining that the media cache is not hit; and
return data to the host.

15. The system of claim 12, wherein the storage controller is further configured to:
determine all data is located in the media cache; and
read the media cache.

16. The system of claim 10, wherein the storage controller is further configured to:
determine partial data is located in the media cache and partial data is located in a null node;
read the media cache;
combine data from the media cache; and
pattern for the null node.

17. One or more computer-readable storage media encoding computer-executable instructions for executing on a computer system a computer process that performs a shingled magnetic recording operation, the computer process comprising:
receiving a TRIM request for a media cache in a storage media from a host;
determining whether a TRIM range in the TRIM request overlaps with an active operation; and
invalidating the TRIM range responsive to determining that the TRIM range does not overlap with an active operation.

18. The one or more computer-readable storage media of claim 17, wherein the computer process further comprises:
inserting at least one null node in the media cache.

* * * * *